US010711394B2

(12) United States Patent
Yi et al.

(10) Patent No.: US 10,711,394 B2
(45) Date of Patent: Jul. 14, 2020

(54) COMPOSITE HAVING PLANT FIBER TEXTILE AND FABRICATING METHOD THEREOF

(71) Applicants: AVIC COMPOSITE CORPORATION LTD., Beijing (CN); AVIC BEIJING INSTITUTE OF AERANUTICAL MATERIALS, Beijing (CN)

(72) Inventors: Xiaosu Yi, Beijing (CN); Yanfeng Liu, Beijing (CN); Shuangying Ji, Beijing (CN); Jianfeng Tong, Beijing (CN); Hongyi Ma, Beijing (CN); Chunrong Jiao, Beijing (CN); Jianwen Bao, Beijing (CN); Qingman Liu, Beijing (CN); Xiancheng He, Beijing (CN); Xu Chen, Beijing (CN); Haichao Cui, Beijing (CN)

(73) Assignees: AVIC COMPOSITE CORPORATION LTD., Beijing (CN); AVIC BEIJING INSTITUTE OF AERANUTICAL MATERIALS, Beijing (CN)

( * ) Notice: Subject to any disclaimer, the term of this patent is extended or adjusted under 35 U.S.C. 154(b) by 1106 days.

(21) Appl. No.: 14/382,414

(22) PCT Filed: Mar. 1, 2013

(86) PCT No.: PCT/CN2013/072087
§ 371 (c)(1),
(2) Date: Oct. 17, 2014

(87) PCT Pub. No.: WO2013/127368
PCT Pub. Date: Sep. 6, 2013

(65) Prior Publication Data
US 2015/0044924 A1 Feb. 12, 2015

(30) Foreign Application Priority Data

Mar. 2, 2012 (CN) .......................... 2012 1 0054309
Sep. 21, 2012 (CN) .......................... 2012 1 0356586

(51) Int. Cl.
*D06M 15/55* (2006.01)
*B32B 5/02* (2006.01)
(Continued)

(52) U.S. Cl.
CPC ............. *D06M 15/55* (2013.01); *B29C 35/02* (2013.01); *B29C 44/1209* (2013.01); *B29C 70/22* (2013.01); *B32B 5/022* (2013.01); *B32B 5/028* (2013.01); *B32B 5/245* (2013.01); *B32B 5/26* (2013.01); *C08J 9/32* (2013.01); *C08L 63/00* (2013.01); *B29K 2001/00* (2013.01); *B29K 2063/00* (2013.01); *B29K 2071/00* (2013.01);

(Continued)

(58) Field of Classification Search
CPC ...... D06M 15/55; C08J 9/32; C08J 2201/026; C08J 2363/00; B29C 44/1209; B29C 70/22; B29C 35/02; B29C 70/04; B32B 5/028; B32B 5/245; B32B 5/022; B32B 5/26; B32B 2262/0253; B32B 2262/0261; B32B 2307/304; B32B 2260/046; B32B 2260/023; B32B 2307/102; B32B 2266/0278; B32B 2266/0271; B32B 2266/025; B32B 2307/54; B32B 2266/0235; C08L 63/00; B29K 2093/00; B29K 2105/048; B29K 2311/10; B29K 2063/00; B29K 2081/06; B29K 2105/089; B29K 2071/00; B29K 2105/0014; B29K 2279/085; B29K 2995/0016; B29K 2001/00; Y10T 428/27; Y10T 428/249953; Y10T 442/60; Y10T 442/10; D01B 2201/01

See application file for complete search history.

(56) References Cited

U.S. PATENT DOCUMENTS

2009/0308001 A1* 12/2009 Wu .......................... E04B 1/762
                                                                                            52/173.3
2010/0324208 A1* 12/2010 Motsanos ............... B29C 70/20
                                                                                           524/612
2011/0171867 A1 7/2011 Li et al.

FOREIGN PATENT DOCUMENTS

CN            1923506 A      3/2007
CN            1308364 C      4/2007
(Continued)

OTHER PUBLICATIONS

Silane Coupling Agents, pp. 1-6, 2012.*
(Continued)

*Primary Examiner* — Elizabeth C Imani
(74) *Attorney, Agent, or Firm* — Hauptman Ham, LLP

(57) ABSTRACT

The present disclosure provides a plant fiber textile, a laminate with the plant fiber textile and a fabricating method of the laminate. The plant fiber textile has a matrix resin and continuous plant fibers distributed within the matrix resin. The plant fibers are subjected to a surface modification pretreatment including a coupling treatment with a coupling agent and/or a fire retardation treatment with a fire retardant. The laminate has a stack structure including a layer of the plant fiber textile and at least one layer selected from a group consisting of following layers: glass fiber, aramid fiber or carbon fiber non-woven cloth or textile, preferably distributed within the matrix resin; polymer fiber non-woven cloth or textile, preferably distributed within the matrix resin; or polymer foam or rubber material.

10 Claims, No Drawings

(51) Int. Cl.
    *B32B 5/24*      (2006.01)
    *B32B 5/26*      (2006.01)
    *C08L 63/00*     (2006.01)
    *B29C 70/22*     (2006.01)
    *C08J 9/32*      (2006.01)
    *B29C 44/12*     (2006.01)
    *B29C 35/02*     (2006.01)
    *B29K 311/10*    (2006.01)
    *B29K 105/04*    (2006.01)
    *B29K 1/00*      (2006.01)
    *B29K 63/00*     (2006.01)
    *B29K 71/00*     (2006.01)
    *B29K 81/00*     (2006.01)
    *B29K 105/00*    (2006.01)
    *B29K 105/08*    (2006.01)
    *B29K 279/00*    (2006.01)
    *B29L 31/08*     (2006.01)

(52) U.S. Cl.
    CPC ...... *B29K 2081/06* (2013.01); *B29K 2093/00* (2013.01); *B29K 2105/0014* (2013.01); *B29K 2105/048* (2013.01); *B29K 2105/089* (2013.01); *B29K 2279/085* (2013.01); *B29K 2311/10* (2013.01); *B29K 2995/0016* (2013.01); *B29L 2031/087* (2013.01); *B32B 2260/023* (2013.01); *B32B 2260/046* (2013.01); *B32B 2262/0253* (2013.01); *B32B 2262/0261* (2013.01); *B32B 2262/0276* (2013.01); *B32B 2262/065* (2013.01); *B32B 2266/025* (2013.01); *B32B 2266/0235* (2013.01); *B32B 2266/0271* (2013.01); *B32B 2266/0278* (2013.01); *B32B 2307/102* (2013.01); *B32B 2307/304* (2013.01); *B32B 2307/54* (2013.01); *C08J 2201/026* (2013.01); *C08J 2363/00* (2013.01); *D10B 2201/01* (2013.01); *Y10T 428/249921* (2015.04); *Y10T 428/249953* (2015.04); *Y10T 428/27* (2015.01); *Y10T 442/10* (2015.04); *Y10T 442/20* (2015.04); *Y10T 442/60* (2015.04)

(56) References Cited

FOREIGN PATENT DOCUMENTS

| | | | |
|---|---|---|---|
| CN | 101220561 A | | 7/2008 |
| CN | 101260228 A | | 9/2008 |
| CN | 102173153 A | | 9/2011 |
| CN | 102321977 A | | 1/2012 |
| CN | 102352089 A | * | 2/2012 |
| CN | 102352089 A | | 2/2012 |
| CN | 102582207 A | | 7/2012 |
| CN | 102838844 A | * | 12/2012 |
| DE | 4408855 A1 | * | 9/1995 ............ B29C 70/04 |
| DE | 10251518 B4 | | 10/2009 |
| JP | H11-144010 A | | 5/1999 |
| JP | 2011132274 A | * | 7/2011 |

OTHER PUBLICATIONS

Europe Patent Office, "Search Report for EP 13755688.2," dated Oct. 29, 2015.
Europe Patent Office, "Office Action for European Patent Application No. 13755688.2," dated Sep. 27, 2016.
PCT, "International Search Report for International Application No. PCT/CN2013/072087," dated Jun. 6, 2013.
PCT, "International Preliminary Report on Patentability for International Application No. PCT/CN2013/072087," dated Sep. 2, 2014.
China Patent Office, "First Office Action for CN 201110181785.3," dated May 25, 2012.
China Patent Office, "First Office Action for CN 201210054309.X," dated Dec. 27, 2013.

* cited by examiner

US 10,711,394 B2

COMPOSITE HAVING PLANT FIBER TEXTILE AND FABRICATING METHOD THEREOF

CROSS-REFERENCE TO RELATED APPLICATION

The present application is National Phase of International Application No. PCT/CN2013/072087 filed Mar. 1, 2013, and claims priority from Chinese Application No. 201210054309.X filed Mar. 2, 2012 and Chinese Application No. 201210356586.6 filed Sep. 21, 2012.

FIELD

The present disclosure relates to a composite having a plant fiber textile and a fabricating method thereof.

BACKGROUND

Composite has been widely used as a light weight and high strength structure material due to advantages such as high specific strength and specific rigidity. In certain applications such as some specific parts in a propeller plane, some functional composite laminates is also needed as covering protective layers. On one hand, such composite can absorb sound, reduce vibration and lower noise; on the other hand, the composite can also have good shock resistance for example. to be used in a plane body which can endure accidental strikes by debris. Therefore, the composite can not only have functionalities such as sound absorption, vibration reduction, thermal insulation and noise cancellation, but also can serve as a weak load bearing structure. Other typical applications for such composite include inner decoration for the airplanes, ground transportations and ships. Foam material is one kind of composite with low density and moderate and adjustable mechanical property. Depending on the material selection and structure design, foam material can also have functionalities such as vibration reduction and noise cancellation, low thermal conduction and thermal insulation, as well as serving as filler. Therefore, it can be used within a cabin or used as inner decoration in vehicles, trains, airplanes and household. However, foam materials have a common trait of relative low rigidity and strength.

The mechanical properties of the above foam material can be significantly improved by fibers, particularly long fibers or continuous fibers. To this end, some trinary composite foam laminates are proposed. A fabricating method of a web like composite foam made by a trinary material of fibers, curable thermosetting resin and expandable micro spheres was disclosed by U.S. Pat. No. 4,483,889 entitled "Method for the production of fiber composite materials impregnated with resin" disclosed. An expandable microsphere with thermal foaming agent encapsulated by expandable polymer was disclosed by U.S. Pat. No. 4,513,106 entitled "Process for expandable microspheres". An expandable microsphere with thermal foaming agent encapsulated by expandable polymer shell was disclosed by U.S. Pat. No. 5,834,526 entitled "Expandable hollow particles". The above patented technologies can be used to fabricate a continuous glass fiber reinforced composite foam laminate, which is now commercially available.

However, the above continuous fibers used in the above technologies are conventional solid fiber materials, such as glass fiber, carbon fiber or organic synthetic fiber, which do not have good functionalities in vibration reduction and noise cancellation as well as sound absorption and insulation. Therefore they can not be used in applications specifically demanding for vibration reduction and low noise, such as inner walls and floor of engine chamber.

Plant fibers come from natural crops which are conventionally used to manufacture papers, clothes or ropes etc. . . . . The hollow structure in some plant fibers enables excellent properties of sound absorption, vibration reduction, heat insulation, noise cancellation and damping. They also have good specific strength and specific rigidity and relatively low cost, therefore those plant fibers can be applied in the composite as environmentally friendly material.

However, plant fibers and resin matrix in the composite have poor interface compatibility, which adversely affects mechanical properties of the composite. In addition, plant fibers are too flammable to be used in fireproof-demanded applications.

In Chinese patent application No. 200610150159.7 entitled "Plant fiber glass steel composite and fabricating method thereof", Chinese patent application No. 200410028501.7 entitled "Thermal pressing fabricating method of polyethylene fiber-plant fiber composite" and Chinese patent application No. 200610062751.1 entitled "Plant fiber composite laminate and producing process thereof", plant fibers in forms of powders or short fibers are used to fill in or reinforce the composite, and plant plane fibers are not subjected to a preliminary treatment. Therefore the composite has poor interface compatibility and consequently has low mechanical properties.

Fiber-metal laminate is new hybrid-reinforced composite abbreviated generally as FML laminate. The typical examples of FML include aramid-aluminum laminate abbreviated as ARALL and glass-reinforced aluminum abbreviated as GLARE. A method of fabricating such composite laminate was described in detail in US patents (U.S. Pat. Nos. 5,039,571, 5,547,735 and 5,219,629) and a non-patent literature (Vogelesang, L., Development of a New Hybrid Material (ARALL) for Aircraft Structure, Ind. Eng. Chem. Prod. Res. Dev., 1983, pp. 492-496). Currently, GLARE has been widely applied to the upper body of A380 plane body.

SUMMARY

The present invention proposes a composite having a plant fiber textile and a fabricating method thereof.

According to one aspect of the present invention, there is provided a composite comprising a matrix resin and a plant fiber textile disposed within the matrix resin, wherein plant fibers of the plant fiber textile are subjected to a surface modification pretreatment comprising coupling treatment with a coupling agent and/or a fire retardation treatment with fire retardants, the matrix resin is a biomass matrix resin.

In one example, the biomass matrix resin is a rosin based epoxy resin and/or an expandable biomass resin.

In one example, the plant fiber is a fiber of a plant selected from the group consisting of ramie, jute, kenaf, hemp, sisal or flax. The plant fiber textile is a continuous plant fiber textile, laid fabric, mesh cloth or non-continuous plant fiber non-woven cloth.

In one example, the coupling agent is a silane coupling agent or a potassium permanganate solution. The silane coupling agent is at least one selected from the group consisting of vinyltriethoxysilane, γ-(methacryloxy)propyltrimethoxysilane, γ-amino propyltriethoxysilane, and γ-(2, 3-epoxy-propoxy)propyltrimethoxysilane. The fire retardant is a nitrogen phosphor based fire retardant selected from the group consisting of ZR-PZM type expandable fire retardant, TZ-01 nitrogen phosphor general fire retardant, TPU-1 or Newray 911.

In one example, the composite comprises at least one additional layer selected from the group consisting of following layers: glass fiber, aramid fiber or carbon fiber non-woven cloth or textile, preferably dispersed within the matrix resin; polymer fiber non-woven cloth or textile, preferably dispersed within the matrix resin, the polymer fiber non-woven cloth or textile comprising: polyimide fiber, polybenzimidazole, polybenzoxazole, polylactic acid, polyethylene, polypropylene or nylon fiber non-woven cloth or fiber textile; polymer foam or rubber material, the polymer foam comprising polyimide, polymethacrylimide, polyvinyl chloride, polyethylene, polypropylene, epoxy, polyurethane, phenol-formaldehyde foam, the rubber material comprising butylbenzene, bucrilate, maleic, Polysulfide or silicon rubber.

In one example, the plant fibers have an area density of 20 g/m$^2$-300 g/m$^2$ and the matrix resin is biomass rosin based epoxy resin, wherein the plant fibers have a content of 10-70 wt % and the matrix resin has a content of 30-90 wt % in the composite.

In one example, the composite is a foam laminate, the matrix resin is an expandable biomass resin as well as biomass epoxy resin, and the plant fibers have a content of 40-60 wt % in the composite.

According to one aspect of the present invention, there is provided a method of fabricating the composite having a plant fiber textiled. The method comprises preparing the plant fiber textile with the plant fibers subjected to surface modification pretreatment using coupling agent and/or fire retardant; preparing a biomass matrix resin prepolymer; preimpregnating the plant fiber textile subjected to surface modification into the biomass matrix resin prepolymer; and curing and molding the impregnated plant fiber textile to fabricate the composite.

After the surface modification pretreatment using potassium permanganate solution as the coupling agent, the plant fiber textile is dried, dipped into water to remove the residual potassium permanganate solution, and then dried again.

The step of preparing a biomass matrix resin prepolymer comprises: mixing rosin based epoxy resin, epoxy resin curing agent, curing accelerant and thermoplastic polymer at an elevated temperature and then cooling the mixture so as to obtain the biomass rosin based epoxy resin prepolymer.

The rosin based epoxy resin, epoxy resin curing agent, curing accelerant and thermoplastic polymer have a weight ratio of the rosin based epoxy resin:epoxy resin curing agent:curing accelerant:thermoplastic polymer=100 weight parts:10~100 weight parts:0.5~3 weight parts:10~50 weight parts. The epoxy resin curing agent is methyl nadie anhydride, methylhexahydrophthalic anhydride, methyltetrahydrophthalic anhydride, dicyandiamide or oxaborinane-boron amine complexes. The curing accelerant is DMP-30, boron trifluoride-ethylamine complex or 1,1-dimethyl-3-phenylurea. The thermoplastic polymer is phenolphthalein modified polyether ketone, phenolphthalein modified polyether sulfone or phenolphthalein modified polyimide.

The step of preimpregnating the plant fiber textile subjected to surface modification pretreatment into the biomass matrix resin prepolymer comprises: applying the biomass rosin based epoxy resin prepolymer uniformly on a surface of a release paper; and transferring the biomass rosin based epoxy resin prepolymer onto the plant fiber textile by a heating pressure roller.

The step of preparing the plant fiber textile comprises: preparing a plant fiber felt and performing surface-premodification on the plant fiber felt using coupling agent and fire retardant.

The step of preparing biomass matrix epoxy prepolymer comprises: preparing a micro-capsule foaming agent comprising following steps of preparing a shell of the micro-capsule; filling the shell with alkane and heating to expand the capsule; mixing and grinding Maleated rosin based epoxy resin curing agent with epoxy resin to prepare a fine powder of partially biomassed epoxy resin; adding the micro-capsule foaming agent into the fine powder of epoxy resin to prepare an aqueous suspension; and impregnating the surface pre-modified plant fiber felt into the aqueous suspension and drying it to prepare a foam pre-impreg.

The a step of curing and molding the impregnated plant fiber textile comprises: heating and soaking the foam pre-impreg to expand the plant fiber felt and forming a foam laminate of a fiber-reinforced biomass epoxy resin composite.

In the examples mentioned above, the step of preparing the plant fiber felt is performed by needling or felting technique, the plant fiber felt has a thickness of 0.1-5 mm. The shell of the micro-capsule is made of polylactide, silicon rubber, polyacrylonitrile or polyethyl methacrylate, the micro-capsule foaming agent has a particle size of 5 μm-50 μm, the micro-capsule is heated at a temperature of 100° C.-180° C., the micro-capsule expands by 50-100 times after heating. The fine powder of epoxy resin has a particle size of 10 μm-100 μm, the micro-capsule foaming agent has a content of 5%-15 wt % in the fine powder of epoxy resin. The foam pre-impreg is heated to 100° C.-180° C. and soaked for 10 min-15 min to expand the plant fiber felt by 5-8 times in a thickness thereof.

According to the present invention, a green biomass based composite comprising a biomass based epoxy resin reinforced by plant fibers is proposed to replace the conventional interface-reinforced material of glass fibers or other chemical fibers. The composite can be used to prepare green composite material parts and fabricate green composite material products comprising the biomass based epoxy resin reinforced by plant fibers in large scale, so as to maximize the proportion of renewable components in composite material.

According to the present invention, a renewable and pure natural plant fiber material is used as the basic reinforced material and is subjected to proper fire retardation treatment, anti-ageing and interface treatment, which fully utilizes hollow and lightweight mechanical and acoustic properties; meanwhile the renewable biomass based resin can serve as the foaming micro-capsule and curable or thermal molding resin so as to be configured to fabricate the biomass based resin composite foam laminates reinforced by continuous plant fibers. The reinforcement materials are selected from natural and renewable plants, which have comparable properties as the conventional materials with better mechanical properties of specific strength and specific rigidity. The foaming micro-capsule and impregnating resin of the biomass based resin comes from natural plants, which comparable properties as the conventional materials. Due to the multi-dimensional and multi-layered porous and hollow structural characteristics that most plant fibers have, the composite foam laminate has better damping and acoustic properties such as vibration and noise cancellation, as well as sound absorption and insulation. Due to the good heat insulation of the plant fibers and the expandable porous structure formed by the foaming particles, the composite foam laminate has good heat insulation and heat preservation. Due to the use of natural plant fibers and biomass based resin, the composite foam laminate is degradable. In addition, due to the renewability of the main raw materials, it is environmentally friendly. The conventional composite foam laminate reinforced by continuous fibers lacks all those advantages and characteristics.

According to the present invention, the periodic or non-periodic layered hybrid composite formed by plant fibers and aramid fiber, glass fiber, carbon fiber or other polymer fiber non-woven cloth or textile enables the layered composite laminate with special abilities of sound absorption, vibration reduction, heat insulation, damping, shock resistance, noise cancellation, in combination with certain specific strength and specific rigidity, which can be used in weak load bearing or non-load bearing applications such as inner decoration in airplanes, railway transition, automobiles and architecture. The novel laminate using the plant fiber textile is called Hybrid Natural fiber Laminate (HyNaL).

DETAILED DESCRIPTION

Embodiments will be described more clearly and fully hereinafter with reference to the accompanying drawings. However, the preset invention can be embodied in a wide variety of forms and should not be limited to the embodiments set forth herein. Rather, the embodiments are provided to make the disclosure sufficient and complete, and fully convey the scope of the present invention to those skilled in the art. The present invention is described in more detail by means of embodiments. The individual features in the embodiments can be achieved by themselves separately or by any combinations of the plurality of features according to the variation of the present invention.

Embodiment 1: Phenol Resin Based Ramie Fiber Textile

The phenol resin based ramie fiber textile according to Embodiment 1 comprises a phenol resin matrix and continuous ramie fibers distributed within the phenol resin. The ramie fibers are subjected to a coupling treatment with vinyltriethoxysilane.

The phenol resin based ramie fiber textile according to Embodiment 1 is fabricated by a method discussed as following.

Firstly, a continuous ramie fiber textile is prepared, which can be selected from a commercially available ramie fiber textile. Vinyltriethoxysilane (Brand name of KH550) is selected as a silane coupling agent. An aqueous solution of the coupling agent with a concentration of 2% is prepared. The ramie fiber textile is impregnated into the solution. A coupled ramie fiber textile is obtained after drying.

Then, a phenol resin (Brand name of GP4141) is selected to pre-impregnate the above coupled ramie fiber textile so that a ramie fiber phenol resin pre-impreg is obtained.

Finally, the phenol resin based ramie fiber textile is prepared by a curing and molding process according to curing parameters of the GP4141 phenol resin pre-impreg.

The interlaminar shear strength (ILSS), bending strength, modulus property and saturated water absorption rate (at 50° C.) of the phenol resin based ramie fiber textile are tested according to common material standards (i.e. ASTM D3039, ASTM D6641, ASTM D790 or ASTM D2344).

The above tests of laminates shows that the properties of the phenol resin fiber textile are significantly improved. The ILSS value is increased from 10 MPa before coupling to 16 MPa after coupling; the bending strength and the modulus values are increased from 100 MPa and 8.5 GPa before coupling to 120 MPa and 9.0 GPa after coupling, respectively. The saturated water absorption rate value is about 5%.

Embodiment 2: Phenol Resin Based Kenaf Fiber Textile

The phenol resin based kenaf fiber textile according to Embodiment 2 comprises a phenol resin matrix and continuous kenaf fibers distributed within the phenol resin. The kenaf fibers are subjected to a coupling treatment with potassium permanganate.

The phenol resin based kenaf fiber textile according to Embodiment 2 is fabricated by a method discussed as following.

Firstly, a continuous kenaf fiber textile is prepared, which can be selected from a commercially available kenaf fiber textile. The above kenaf fiber textile is impregnated into an aqueous solution of potassium permanganate (KMnO4) with a concentration of 1%. After the fiber textile is dried, the residual potassium permanganate is removed by dipping the fiber textile into water and the fiber textile is dried again to obtain a coupled kenaf fiber textile.

Then, the phenol resin (Brand name of GP4141) is selected to pre-impregnate the above coupled kenaf fiber textile so that a kenaf fiber phenol resin pre-impreg is obtained.

Finally, a phenol resin based kenaf fiber textile is prepared by a curing and molding process according to curing parameters of the GP4141 phenol resin pre-impreg.

The above tests of laminates shows that the properties of the phenol resin fiber textile are significantly improved. The ILSS value is increased from 7 MPa before coupling to 10 MPa after coupling; the bending strength value is 68 MPa before and after coupling without change. The modulus values are increased from 7.0 GPa before coupling to 7.2 GPa after coupling. The saturated water absorption rate value is about between 6-7%.

Embodiment 3: Phenol Resin Based Plant Fiber Textile

The phenol resin based plant fiber textile according to Embodiment 3 comprises a phenol resin matrix and continuous ramie, jute, sisal and kenaf fibers distributed within the phenol resin. The ramie fibers are subjected to a coupling treatment with vinyltriethoxysilane and potassium permanganate.

The phenol resin based plant fiber textile according to Embodiment 3 is fabricated by a method discussed as following.

Firstly, continuous ramie, jute, sisal and kenaf fiber textiles are prepared, respectively, which can be selected from commercially available plant fiber textiles. Vinyltriethoxysilane (Brand name of KH550) with a concentration of 2% is selected as an aqueous solution of a silane coupling agent to impregnate the above plant fiber textiles. An aqueous solution of potassium permanganate with a concentration of 0.1% is selected to impregnate the above plant fiber textiles. Eight coupled plant fiber textiles are obtained after drying, cleaning and drying again.

Then, a phenol resin (Brand name of GP4141) is selected to pre-impregnate the above eight coupled plant fiber textiles so that corresponding plant fiber phenol resin pre-impregs are obtained.

Finally, the corresponding phenol resin based plant fiber textiles are prepared by a curing and molding process according to curing parameters of the GP4141 phenol resin pre-impreg.

The interlaminar shear strength (ILSS) of the above phenol resin based plant fiber textiles is tested according to common material standards in Embodiment 1, which is listed as below in Table 1.

TABLE 1

Interlaminar Shear Strength of the phenol resin based plant fiber textiles

| GP4141 phenol resin based plant fiber | Before coupling treatment (MPa) | Potassium permanganate treatment | KH550 silane coupling treatment |
|---|---|---|---|
| Sisal | 5.79 | 6.22 | 7.49 |
| Ramie | 9.63 | 14.95 | 15.63 |
| Kenaf | 7.20 | 8.24 | 9.89 |
| Jute | 8.78 | 9.57 | 8.39 |

The result of the test shows that the ILSS value ranks in the following order: phenol resin based ramie plant fiber>phenol resin based jute plant fiber>phenol resin based kenaf plant fiber>phenol resin based jute plant fiber in terms of the interlaminar shear strength (ILSS) of the above phenol resin based plant fiber textiles. The effect of KH550 silane is better than that of potassium permanganate and the ILSS value of phenol resin based plant fiber textile using KH550 coupling treatment is approximate to or greater than that (7.84 MPa) of conventional phenol resin based glass fiber textile.

Embodiment 4: Fire Retardant Phenol Resin Based Ramie Fiber Textile

The fire retardant phenol resin based ramie fiber textile according to Embodiment 4 is substantially the same as the textile according to Embodiment 1, and differs in that ramie fibers are subjected to a fire retardant treatment so that a continuous plant fiber textile with both reinforced interface compatibility and fire retardation is provided.

The fire retardant phenol resin based ramie fiber textile according to Embodiment 4 is fabricated by a method discussed as following.

Firstly, a continuous ramie fiber textile is prepared, which can be selected from a commercially available ramie fiber textile. Vinyltriethoxysilane (Brand name of KH550) is selected as a silane coupling agent. An aqueous solution of the coupling agent with a concentration of 2% is prepared. The ramie fiber textile is impregnated into the solution. A coupled ramie fiber textile is obtained after drying. Then a fire retardant (i.e. a No. 1 liquid fire retardant produced by Shanghai Xusen free Smoke Suppression Fire Retardant Co., Ltd) is selected to prepare an aqueous solution of fire retardant with a concentration between 10-20%. The coupled ramie fiber textile is impregnated and dried to obtain a corresponding fire retardant phenol resin based ramie fiber textile.

Then, a phenol resin (Brand name of GP4141) according to Embodiment 1 is selected to perform the pre-impregnating, curing and molding treatment so that the fire retardant phenol resin based ramie fiber textile is obtained.

The fire retardant phenol resin based ramie fiber textile is subjected to a combustion test and the result is shown as below: the ignition took 60 seconds and the fire temperature reach 840° C.; the combustion length is about 160 mm during a combustion period of about 2 minutes; and no combustion droplet was found during the combustion test.

In case that the fire retardant has a mass concentration of about 10%, the above fire retardant phenol resin based ramie fiber textile releases a total amount of heat of 50 kw min/m$^2$ with a peak heat release value of 90 kw/m$^2$. In case that the fire retardant has a mass concentration of about 20%, the above fire retardant phenol resin based ramie fiber textile releases a total amount of heat of 22 kw min/m$^2$ with a peak heat release value of 60 kw/m$^2$ during releasing heat. Both materials meet the requirement of the inner decoration of civil aircraft (e.g. Boeing OSU standard).

The mechanical properties of the above fire retardant phenol resin based ramie fiber textile are tested according to the common material standards in Embodiment 1. The fire retardant phenol resin based ramie fiber textile has a tensile strength of about 60 MPa, an interlaminar shear strength of about 15 MPa, a compressive strength of about 50 MPa, a bending strength of about 100 MPa and a modulus of about 8.5 GPa, respectively.

Embodiment 5: Fire Retardant Phenol Resin Based Ramie Fiber Textile and Fire Retardant Phenol Resin Based Jute Fiber Textile The phenol resin based ramie fiber textile according to Embodiment 5 comprises a phenol resin matrix and continuous ramie fibers distributed within the phenol resin. The ramie fibers are subjected to a coupling treatment with vinyltriethoxysilane and fire retardation treatment with a nitrogen phosphor based fire retardant. The phenol resin based jute fiber textile according to Embodiment 5 comprises a phenol resin matrix and continuous jute fibers distributed within the phenol resin. The jute fibers are subjected to a coupling treatment with vinyltriethoxysilane and fire retardation treatment with a nitrogen phosphor based fire retardant.

The fire retardant phenol resin based ramie fiber textile and fire retardant phenol resin based jute fiber textile according to Embodiment 5 are fabricated by a method discussed as following.

Firstly, a continuous ramie fiber textile and a continuous jute fiber textile are separately prepared, which can be selected from a commercially available ramie fiber textile and a commercially available jute fiber textile. Vinyltriethoxysilane (Brand name of KH550) is selected as a silane coupling agent. An aqueous solution of the coupling agent with a concentration of 2% is prepared. The ramie fiber textile and the jute fiber textile are impregnated into the solution respectively. A coupled ramie fiber textile and a coupled jute fiber textile are obtained after drying, respectively.

Then, a nitrogen phosphor based fire retardant (e.g. brand name of Newray 911) is selected to prepare an aqueous solution of fire retardant with a concentration between 7-12%. The coupled ramie fiber textile and the coupled jute fiber textile are separately impregnated and dried to obtain the corresponding fire retardant phenol resin based ramie fiber textile and the fire retardant phenol resin based jute fiber textile.

Then, a phenol resin (Brand name of Cycom 6070) is selected to perform the pre-impregnating, curing and molding treatment so that phenol resin based pre-impregs of the corresponding plant fiber textiles are obtained.

Finally, the fire retardant phenol resin based ramie fiber textile and fire retardant phenol resin based jute fiber textile are prepared by a curing and molding process according to curing parameters of the Cycom 6070 phenol resin pre-impregs.

The vertical combustion performance of the ramie fiber textile is tested according to ASTM materials standard. The result shows that the above ramie fiber textile has a combustion period of less than 15 seconds, a combustion length of about 40 mm and no combustion droplet when the fire retardant has a mass concentration of about 11%. The above ramie fiber textile has a combustion period of less than 15 seconds, a combustion length of about 38 mm and no combustion droplet when the fire retardant has a mass concentration of about 12%. Both materials have a good fire retardant effect.

The above-mentioned is merely the detailed descriptions of the present disclosure, but the protecting scope is not limited to this. The modifications and alternatives thought of by any one of those skilled in the art in the technical scope disclosed by the present disclosure should be included within the protecting scope of the present disclosure. Thus the protecting scope of the present disclosure should subject to the protecting scope of the claims.

Embodiment 6: Fire Retardant Polyester Based Ramie Fiber Textile

The fire retardant polyester based ramie fiber textile according to Embodiment 6 comprises a polyester matrix and continuous ramie fibers distributed within the polyester. The ramie fibers are subjected to a coupling treatment with γ-(methacryloxy)propyltrimethoxysilane and a fire retardation treatment with an expandable nitrogen phosphor fire retardant.

The fire retardant polyester based ramie fiber textile according to Embodiment 6 is fabricated by a method discussed as following.

Firstly, a continuous ramie fiber textile is prepared, which can be selected from a commercially available ramie fiber textile. γ-(methacryloxy)propyltrimethoxysilane (Brand name of KH570) is selected as a silane coupling agent. An aqueous solution of the coupling agent with a concentration of 2% is prepared. The ramie fiber textile is impregnated into the solution. A coupled ramie fiber textile is obtained after drying.

An expandable nitrogen phosphor fire retardant (Brand name of ZR-PZM) is selected to prepare an aqueous solution of a fire retardant with a concentration of 14%. The coupled ramie fiber textile is impregnated and dried to obtain the corresponding fire retardant polyester based ramie fiber textile.

Then, a fire retardant unsaturated polyester (Brand name of Synolite9001) is selected to prepare the fire retardant polyester based ramie fiber textile by a direct liquid molding process with the above ramie fiber textile.

The tensile property and bending property of the fire retardant polyester based ramie fiber textile are tested according to the common material standards in Embodiment 1, and they are compared with those of the ramie fiber textile before the coupling treatment and fire retardation treatment. The ramie fiber textile has a tensile strength of 95 MPa and a bending strength of 156 MPa before the coupling treatment and fire retardation treatment. The ramie fiber textile has a reinforced tensile strength of 103 MPa and a reinforced bending strength of 176 MPa after the coupling treatment and fire retardation treatment.

Embodiment 7: Fire Retardant Epoxy Resin Based Ramie Fiber Textile

The fire retardant epoxy resin based ramie fiber textile according to Embodiment 7 comprises an epoxy resin matrix and continuous ramie fibers distributed within the epoxy resin. The ramie fibers are subjected to a coupling treatment with γ-(2,3-epoxy-propoxy) propyltrimethoxysilane, and the epoxy resin itself is a fire retardant.

The fire retardant epoxy resin based ramie fiber textile according to Embodiment 7 is fabricated by a method discussed as following.

Firstly, a continuous ramie fiber textile is prepared, which can be selected from a commercially available ramie fiber textile. γ-(2,3-epoxy-propoxy)propyltrimethoxysilane (Brand name of KH560) is selected as a silane coupling agent. An aqueous solution of the coupling agent with a concentration of 2% is prepared. The ramie fiber textile is impregnated into the solution. A coupled ramie fiber textile is obtained after drying.

A fire retardant epoxy resin (Brand name of 3233) is selected to perform a pre-impregnating, curing and molding process so that an epoxy resin pre-impreg of the ramie fiber textile is obtained.

The tensile property and bending property of the fire retardant epoxy based ramie fiber textile are tested according to the common material standards in Embodiment 1, and they are compared with those of the ramie fiber textile before the coupling treatment and fire retardation treatment. The ramie fiber textile has a tensile strength of 105 MPa and a bending strength of 178 MPa before the coupling treatment and fire retardation treatment. The ramie fiber textile has a reinforced tensile strength of 123 MPa and a reinforced bending strength of 186 MPa after the coupling treatment and fire retardation treatment.

Embodiment 8: Ramie Fiber-Aramid Fiber Laminate Composite

The ramie fiber-aramid fiber laminate composite according to Embodiment 8 having a laminated structure comprises ramie fiber layers and aramid fiber layers. The ramie fiber layer comprises an epoxy resin matrix and continuous ramie fibers distributed within the epoxy resin. The aramid fiber layer comprises an epoxy resin matrix and continuous aramid fibers distributed within the epoxy resin. The ramie fibers are subjected to a coupling treatment with vinyltriethoxysilane.

The ramie fiber-aramid fiber laminate composite according to Embodiment 8 is fabricated by a method discussed as following.

Firstly, a continuous ramie fiber textile is prepared, which can be selected from a commercially available ramie fiber yarn, for example, the ramie fiber yarn is one-way. Vinyltriethoxysilane (Brand name of KH550) is selected as a silane coupling agent. An aqueous solution of the coupling agent with a concentration of 2% is prepared. The ramie fiber textile is impregnated into the solution. A coupled ramie fiber textile is obtained after drying. The performance and advantages of the above continuous ramie fiber textile can be referred to in Embodiment 1.

Then, an epoxy resin (Brand name of SY-14A) is selected to pre-impregnate the above coupled ramie fiber textile with a wet process so that an epoxy resin pre-impreg of the corresponding ramie fiber textile is obtained. The epoxy resin is also selected to pre-impregnate the above coupled aramid fiber textile by a wet process so that an epoxy resin pre-impreg of the corresponding aramid fiber textile is obtained.

The epoxy resin pre-impreg of the ramie fiber textile and the epoxy resin pre-impreg of the aramid fiber textile are stacked alternatingly to form a five-layered laminated structure of aramid fiber/ramie fiber/aramid fiber/ramie fiber/aramid fiber, so as to obtain a laminate preform with the outmost layer of aramid fiber textile. If the ramie fiber textile has uni-direction, the ramie fibers in the two epoxy resin pre-impregs of the ramie fiber textile can be oriented perpendicular to each other, so that the overall strength is reinforced.

The ramie fiber-aramid fiber laminate composite is fabricated by an autoclave curing and molding process as following. The above laminate preform is placed in a can and evacuated at room temperature to maintain a vacuum pressure difference of not less than 0.095 MPa. It is heated up to 80° C.±2° C. with a ramping rate of 0.5° C./min~2.0° C./min and is kept for 10 min under a contact pressure (or under evacuation). Then it is pressurized to 0.7 MPa~0.8 MPa for 1 hour and naturally cooled down to room temperature. The can is opened to take out a cured product.

Embodiment 9: Jute Fiber-Epoxy Foam-Glass Fiber Laminate Composite

The jute fiber-epoxy foam-glass fiber laminate composite according to Embodiment 9 having a laminated structure comprises a jute fiber layer, an epoxy foam layer and a glass fiber layer. The jute fiber layer comprises an epoxy resin matrix and continuous jute fibers distributed within the epoxy resin. The glass fiber layer comprises an epoxy resin matrix and continuous glass fibers distributed within the epoxy resin. The jute fibers are subjected to a coupling treatment with vinyltriethoxysilane.

The jute fiber-epoxy foam-glass fiber laminate composite according to Embodiment 9 is fabricated by a method discussed as following.

Firstly, a continuous jute fiber textile is prepared. A silane coupling agent (e.g. vinyltriethoxysilane (Brand name of KH550) with a concentration of 2%) or an aqueous solution of potassium permanganate is selected to perform a coupling treatment to the jute fiber textile. A fire retardant (e.g. a nitrogen phosphor fire retardant) is selected to perform a fire retardation treatment to the jute fiber textile so that a fire retardant jute fiber textile is obtained.

The fire retardant jute fiber textile layer/glass fiber textile/epoxy foam/glass fiber textile/fire retardant jute fiber textile are stacked in the above order in a mold and set in a vacuum bag. An epoxy resin (Brand name of 3266) is injected to prepare a laminate preform by a liquid molding process discussed as following. The vacuum bag is evacuated at room temperature to keep a vacuum pressure difference of not less than 0.1 MPa and is heated up to about 40° C. with a ramping rate of 1° C./min~2° C./min to impregnate the above laminate into the epoxy resin.

Then, the jute fiber-epoxy foam-glass fiber laminate composite is fabricated with a curing and molding process discussed as following. After the above perform is fully impregnated with the epoxy resin, it is cured under the same vacuum condition. It is heated up to 100° C.~120° C. with a ramping rate of 1° C./min~2° C./min and is soaked for 2 hours and cooled down to room temperature. The vacuum bag is opened to take out the cured product.

Embodiment 10: Sisal Fiber-Silicon Rubber-Carbon Fiber Laminate Composite

The sisal fiber-silicon rubber-carbon fiber laminate composite according to Embodiment 10 having a laminated structure comprises a sisal fiber layer, a silicon rubber layer and a carbon fiber layer. The sisal fiber layer comprises an epoxy resin matrix and continuous sisal fibers distributed within the epoxy resin. The sisal fibers are subjected to a coupling treatment with vinyltriethoxysilane or potassium permanganate and a fire retardation treatment with a fire retardant.

The sisal fiber-silicon rubber-carbon fiber laminate composite according to Embodiment 10 is fabricated by a method discussed as following.

Firstly, a continuous sisal fiber textile is prepared. A silane coupling agent (i.e. vinyltriethoxysilane (Brand name of KH550) with a concentration of 2%) or an aqueous solution of potassium permanganate is selected to perform a coupling treatment on the sisal fiber textile. A fire retardant (i.e. a nitrogen phosphor fire retardant) is selected to perform a fire retardation treatment on the sisal fiber textile so that a fire retardant sisal fiber textile is obtained.

Two fire retardant sisal fiber layers/carbon fiber textile layer/silicon rubber/carbon fiber textile/two fire retardant sisal fiber layers are stacked in the above order in a mold and set in a vacuum bag. An epoxy resin (Brand name of 3266) is ejected to prepare a laminate preform with a liquid molding method discussed as following. The vacuum bag is evacuated at room temperature to keep a vacuum pressure difference of not less than 0.1 MPa and is heated up to about 40° C. with a ramping rate of 1° C./min~2° C./min to impregnate the above laminate into the epoxy resin.

Then, the sisal fiber-silicon rubber-carbon fiber laminate composite is fabricated with a curing and molding proces discussed as following. After the above perform is fully impregnated with the epoxy resin, it is cured under the same vacuum condition. It is heated up to 100° C.~120° C. with a ramping rate of 1° C./min~2° C./min and is soaked for 2 hours and cooled down to room temperature. The vacuum bag is opened to take out a cured product.

Embodiment 11: Ramie Fiber-Jute Fiber-Glass Fiber Laminate Composite

The ramie fiber-jute fiber-glass fiber laminate composite according to Embodiment 11 having a laminated structure comprises a ramie fiber layer, a jute fiber layer and a glass fiber layer. The ramie fiber layer comprises an epoxy resin matrix and continuous ramie fibers distributed within the epoxy resin. The jute fiber layer comprises an epoxy resin matrix and continuous jute fibers distributed within the epoxy resin. The ramie fibers and the jute fibers are subjected to a coupling treatment with vinyltriethoxysilane, respectively.

The ramie fiber-jute fiber-glass fiber laminate composite according to Embodiment 11 is fabricated by a method discussed as following.

Firstly, a continuous ramie fiber textile and a continuous jute fiber textile are prepared, respectively. A silane coupling agent (i.e. vinyltriethoxysilane (Brand name of KH550) with a concentration of 2%) is selected to perform a coupling treatment to the ramie fiber textile and the jute fiber textile, respectively.

Then, an epoxy resin (Brand name of 3233) is selected to pre-impregnate the above coupled ramie fiber textile, jute fiber textile and glass fiber textile by a wet process so that an epoxy resin pre-impreg of the respective ramie fiber textile, jute fiber textile and glass fiber is obtained, respectively.

The above pre-impregs are stacked alternatingly in a mold to form a five-layered perform of ramie fiber/jute fiber/glass fiber/jute fiber/ramie fiber.

The ramie fiber-jute fiber-glass fiber laminate composite is fabricated with a compressive curing and molding process discussed as following. The above preform is heated up to 80° C.±2° C. and is soaked for 10 min. Then it is pressurized to 0.7 MPa~0.8 MPa for 2 hours and cooled down to room temperature so that the cured product is obtained.

Embodiment 12: Flax Fiber-Polyvinyl Chloride Foam Laminate Composite

The flax fiber-polyvinyl chloride laminate composite according to Embodiment 12 having a laminated structure comprises a flax fiber layer and a polyvinyl chloride foam layer. The flax fiber layer comprises an epoxy resin matrix and continuous flax fibers distributed within the epoxy resin. The flax fibers are subjected to a coupling treatment with vinyltriethoxysilane and a fire retardation treatment with a fire retardant.

The flax fiber-polyvinyl chloride laminate composite according to Embodiment 12 is fabricated by a method discussed as following.

Firstly, a continuous flax fiber textile and a continuous jute fiber textile are prepared, respectively. A silane coupling agent (i.e. vinyltriethoxysilane (Brand name of KH550) with a concentration of 2%) and a fire retardant are selected to perform a coupling treatment and a fire retardation treatment to the flax fiber textile, respectively.

Then, an epoxy resin (Brand name of 3233) is selected to pre-impregnate the above coupled and fire retarded flax fiber textile by a wet process so that an epoxy resin pre-impreg of the corresponding flax fiber textile is obtained.

The above pre-impregnated layer and polyvinyl chloride foam layer are stacked alternatingly in a mold to form a five-layered perform of flax fiber/polyvinyl chloride/flax fiber/polyvinyl chloride/flax fiber.

The flax fiber-polyvinyl chloride laminate composite is fabricated with a compressive curing and molding process.

Embodiment 13: Flax Fiber-Rubber Laminate Composite

The flax fiber-rubber laminate composite according to Embodiment 13 has a laminated structure comprising a flax fiber layer and a rubber layer. The flax fiber layer comprises an epoxy resin matrix and continuous flax fibers distributed within the epoxy resin. The flax fibers are subjected to a coupling treatment with vinyltriethoxysilane and a fire retardation treatment with a fire retardant.

The flax fiber-rubber laminate composite according to Embodiment 13 is fabricated by a method discussed as following.

Firstly, a continuous flax fiber textile is prepared. A silane coupling agent (i.e. vinyltriethoxysilane (Brand name of KH550) with a concentration of 2%) and a fire retardant are selected to perform a coupling treatment and a fire retardation treatment on the flax fiber textile, respectively.

Then, an epoxy resin (Brand name of 3233) is selected to pre-impregnate the above coupled and fire retarded flax fiber textile by a wet process so that an epoxy resin pre-impreg of the corresponding flax fiber textile is obtained.

The above pre-impregnated layer and rubber layer are stacked alternatingly in a mold to form a five-layered perform of flax fiber/rubber/flax fiber/rubber/flax fiber.

The flax fiber-rubber laminate composite is fabricated with a compressive curing and molding process.

Embodiment 14: Sisal Fiber-Polymer Foam Laminate Composite

The sisal fiber-polymer foam laminate composite according to Embodiment 14 having a laminated structure comprises a sisal fiber layer and a polymer foam layer. The sisal fiber layer comprises an epoxy resin matrix and continuous sisal fibers distributed within the epoxy resin. The sisal fibers are subjected to a coupling treatment with vinyltriethoxysilane and a fire retardation treatment with a fire retardant.

The flax fiber-polymer foam laminate composite according to Embodiment 14 is fabricated by a method discussed as following.

Firstly, a continuous sisal fiber textile is prepared. A silane coupling agent (i.e. vinyltriethoxysilane (Brand name of KH550) with a concentration of 2%) and a fire retardant are selected to perform a coupling treatment and a fire retardation treatment on the flax fiber textile, respectively.

Then, an epoxy resin (Brand name of 3233) is selected to pre-impregnate the above coupled and fire-retarded sisal fiber textile by a wet process so that an epoxy resin pre-impreg of the corresponding sisal fiber textile is obtained.

The above pre-impregnated layer and polymer foam layer are stacked alternatingly in a mold to form a five-layered perform of sisal fiber/polymer foam/sisal fiber/polymer foam/sisal fiber.

The flax fiber-polymer foam laminate composite is fabricated with a compressive curing and molding process.

The plant fiber textiles in Embodiments 1-7 can be combined with glass fiber, aramid fiber, or carbon fiber non-woven textile and/or polymer fiber non-woven textile cloth or textile or polymer foam or rubber material, so that a novel and environmentally friendly plant fiber hybrid composite laminate (HyNal) with vibration reduction, sound absorption, noise cancellation and fire retardation is provided.

The composites in Embodiments 8-14 have a central symmetrical structure for convenience of use and transportation. But the plant fiber hybrid composite according to the present invention can also have other periodic or non-periodic structure so as to meet particular requirements.

Embodiment 15: Ramie Fiber Mesh Cloth Reinforced Rosin Based Epoxy Resin Composite The ramie fiber mesh cloth reinforced rosin based epoxy resin composite comprises a rosin based epoxy resin and ramie fiber mesh cloth distributed within the rosin based epoxy resin.

The ramie fiber mesh cloth reinforced rosin based epoxy resin composite according to Embodiment 15 is fabricated by a method discussed as following.

A ramie fiber mesh cloth with an area density of 20 g/m$^2$ is prepared.

1000 g of rosin based epoxy resin, 1000 g of methylhexahydrophthalic anhydride, 20 g boron of trifluoride-ethylamine complex and 500 g of phenolphthalein modified polyether ketone are added into a stirring pot, heated to 50° C. and stirred for 20 minutes with a high speed so that a rosin based epoxy resin structure adhesive is obtained. The prepared rosin based epoxy resin structure adhesive can be applied on a release paper and cooled down to room temperature and refrigerated to be ready for use.

The prepared rosin based epoxy resin structure adhesive is uniformly applied on a surface of a release paper with an area density of 180 g/m² by a pre-impregnating machine. Then the rosin based epoxy resin structure adhesive is transferred onto the ramie fiber mesh cloth by a heating pressure roller. The structure adhesive has a weight content of about 90% in the composite. Both sides of the ramie fiber mesh cloth reinforced rosin based epoxy resin composite can be protected by the release papers. The composite can be preserved at room temperature or be refrigerated after wrapping and rolling.

The ramie fiber mesh cloth reinforced rosin based epoxy resin composite laminate and a honeycomb core laminate are stacked to form a composite part. The composite part is fabricated by a method discussed as following: the ramie fiber mesh cloth reinforced rosin based epoxy resin composite and a Nomex honeycomb core laminate an with a density of 48 Kg/m³ are stacked in a vacuum bag molding process, and co-molded at a temperature of 140° C. for 2 hours, then cooled down to 40° C. with the pressure released, so that the composite part is obtained. The flatwise tensile strength (Testing standard of ASTM C297) and shear strength (Testing standard of ASTM C273) are tested with a result listed in following Table 2.

TABLE 2

| Flatwise tensile strength/ MPa | L direction shear strength/ MPa | W direction shear strength/ MPa |
|---|---|---|
| 1.02 | 1.21 | 0.65 |

In such composite, the mechanical properties are improved and the damage of the composite part is more likely caused by the Nomex honeycomb core.

Embodiment 16: Ramie Fiber Laid Fabric Cloth Reinforced Rosin Based Epoxy Resin Composite The ramie fiber laid fabric cloth reinforced rosin based epoxy resin composite comprises a rosin based epoxy resin and a ramie fiber laid fabric cloth distributed within the rosin based epoxy resin.

The ramie fiber laid fabric cloth reinforced rosin based epoxy resin composite according to Embodiment 16 is fabricated by a method discussed as following.

A ramie fiber laid fabric cloth with an area density of 150 g/m² is prepared.

1500 g of rosin based epoxy resin, 1200 g of methyl nadic anhydride, 7.5 g of DMP-30 and 270 g of phenolphthalein modified polyether sulfone are added into a stirring pot, heated to 70° C. and stirred for 30 minute with a high speed so that a rosin based epoxy resin structure adhesive is obtained. The prepared rosin based epoxy resin structure adhesive can be applied on a release paper and cooled down to room temperature and be refrigerated to be ready for use.

The prepared rosin based epoxy resin structure adhesive is uniformly applied on a surface of a release paper with an area density of 150 g/m² by a pre-impregnating machine. Then the rosin based epoxy resin structure adhesive is transferred onto the ramie fiber laid fabric cloth by a heating pressure roller. The structure adhesive has a weight content of about 50% in the composite. Both sides of the ramie fiber non-woven cloth reinforced rosin based epoxy resin composite can be protected by the release papers. The composite can be preserved at room temperature or be refrigerated after wrapping and rolling.

The composite is used to fabricate a ramie fiber reinforced biomass based resin composite product. The composite product is fabricated with a method discussed as following: in a compressive molding process, 18 layers of the composite are stacked in a mold and pressurized to 2 MPa. It is gradually heated up to 120° C. and cured for 3 hours. Then it is cooled down to 40° C. with the pressure released. The fibers have a weight content of about 50% in the composite. The tensile strength (Testing standard of ASTM D3039), compressive strength (Testing standard of ASTM D6641) and bending strength (Testing standard of ASTM D790) are tested with a result listed in following Table 3.

TABLE 3

| Tensile strength | | Compressive strength | | Bending strength | |
|---|---|---|---|---|---|
| Strength/ MPa | Modulus/ GPa | Strength/ MPa | Modulus/ GPa | Strength/ MPa | Modulus/ GPa |
| 298.3 | 32.1 | 200.4 | 29.5 | 321.6 | 30.2 |

Embodiment 17: Jute Fiber Mesh Cloth Reinforced Rosin Based Epoxy Resin Composite The jute fiber mesh cloth reinforced rosin based epoxy resin composite comprises a rosin based epoxy resin and jute fiber mesh cloth distributed within the rosin based epoxy resin.

The jute fiber mesh cloth reinforced rosin based epoxy resin composite according to Embodiment 17 is fabricated by a method discussed as following.

A jute fiber mesh cloth with an area density of 100 g/m² is prepared.

1000 g of rosin based epoxy resin, 1000 g of methyltetrahydrophthalic anhydride, 10 g of boron trifluoride-ethylamine complex and 300 g of phenolphthalein modified polyether ketone are added into a stirring pot, heated to 50° C. and stirred for 30 minute with a high speed so that a rosin based epoxy resin structure adhesive is obtained. The prepared rosin based epoxy resin structure adhesive can be applied on a release paper and cooled down to room temperature and be refrigerated to be ready for use.

The prepared rosin based epoxy resin structure adhesive is uniformly applied on a surface of a release paper by a pre-impregnating machine. Then the rosin based epoxy resin structure adhesive is transferred onto the jute fiber mesh cloth by a heating pressure roller. The structure adhesive has a weight content of about 50% in the composite. Both sides of the jute fiber mesh cloth reinforced rosin based epoxy resin composite can be protected by the release papers. The composite can be preserved at room temperature or be refrigerated after wrapping and rolling.

The above jute fiber mesh cloth reinforced rosin based epoxy resin composite laminate and a honeycomb core laminate are stacked to form a composite part. The composite part is fabricated by a method discussed as following: the jute fiber mesh cloth reinforced rosin based epoxy resin laminate and an Nomex honeycomb core laminate with a density of 48 Kg/m³ are stacked in a vacuum bag molding process, and co-molded at a temperature of 140° C. for 2 hours, then cooled down to 40° C. with the pressure released, so that the composite part is obtained. The flatwise tensile strength (Testing standard of ASTM C297) and shear strength (Testing standard of ASTM C273) are tested with a result listed in following Table 4.

TABLE 4

| Flatwise tensile strength/ MPa | L direction shear strength/ MPa | W direction shear strength/ MPa |
|---|---|---|
| 0.97 | 1.15 | 0.59 |

In such composite, the mechanical properties are improved and the damage of the composite part is more likely caused by the Nomex honeycomb core.

Embodiment 18: Flax Fiber Laid Fabric Cloth Reinforced Rosin Based Epoxy Resin Composite The flax fiber laid fabric cloth reinforced rosin based epoxy resin composite comprises a rosin based epoxy resin and flax fiber laid fabric cloth distributed within the rosin based epoxy resin.

The flax fiber laid fabric cloth reinforced rosin based epoxy resin composite according to Embodiment 18 is fabricated by a method discussed as following.

A flax fiber laid fabric cloth with an area density of 200 g/m$^2$ is prepared.

1000 g of rosin based epoxy resin, 100 g of dicyandiamide, 30 g of 1,1'-dimethyl-3-phenylurea and 200 g of phenolphthalein modified polyether ketone are added into a stirring pot, heated to 50° C. and stirred for 20 minutes with a high speed so that a rosin based epoxy resin structure adhesive is obtained. The prepared rosin based epoxy resin structure adhesive can be applied on a release paper and cooled down to room temperature and be refrigerated to be ready for use.

The prepared rosin based epoxy resin structure adhesive is uniformly applied on a surface of a release paper by a pre-impregnating machine. Then the rosin based epoxy resin structure adhesive is transferred onto the flax fiber laid fabric cloth by a heating pressure roller. The structure adhesive has a weight content of about 40% in the composite. Both sides of the flax fiber laid fabric cloth reinforced rosin based epoxy resin composite can be protected by the release papers. The composite can be preserved at room temperature or refrigerated after wrapping and rolling.

The composite is used to fabricate a flax fiber reinforced biomass based resin composite product. The composite product is fabricated by a method discussed as following: in a compressive molding process, 18 layers of the composite are stacked in a mold and pressurized to 2 MPa. It is heated up gradually to 120° C. and cured for 3 hours. Then it is cooled down to 40° C. with the pressure released. The fibers have a weight content of about 70% in the composite. The tensile strength (Testing standard of ASTM D3039), compressive strength (Testing standard of ASTM D6641) and bending strength (Testing standard of ASTM D790) are tested with a result listed in following Table 5.

TABLE 5

| Tensile strength | | Compressive strength | | Bending strength | |
|---|---|---|---|---|---|
| Strength/ MPa | Modulus/ GPa | Strength/ MPa | Modulus/ GPa | Strength/ MPa | Modulus/ GPa |
| 204.5 | 25.4 | 156.7 | 19.4 | 220.4 | 20.4 |

Embodiment 19: Ramie Fiber Textile Reinforced Rosin Based Epoxy Resin Composite

The ramie fiber textile reinforced rosin based epoxy resin composite comprises a rosin based epoxy resin and a ramie fiber textile distributed within the rosin based epoxy resin.

The ramie fiber textile reinforced rosin based epoxy resin composite according to Embodiment 19 is fabricated by a method discussed as following.

A ramie fiber textile with an area density of 120 g/m$^2$ is prepared.

1500 g of rosin based epoxy resin II, 1000 g of methyl nadie anhydride, 20 g of boron trifluoride-ethylamine complex and 500 g of phenolphthalein modified polyether sulfone are added into a stirring pot, heated to 70° C. and stirred for 30 minutes with a high speed so that a rosin based epoxy resin structure adhesive is obtained. The prepared rosin based epoxy resin structure adhesive can be applied on a release paper and cooled down to room temperature and be refrigerated to be ready for use.

The prepared rosin based epoxy resin structure adhesive is uniformly applied on a surface of a release paper by a pre-impregnating machine, then is transferred onto the ramie fiber textile by a heating pressure roller. The structure adhesive has a weight content of about 50% in the composite. Both sides of the ramie fiber textile reinforced rosin based epoxy resin composite can be protected by the release papers. The composite can be preserved at room temperature or refrigerated after wrapping and rolling.

The composite is used to fabricate a ramie fiber reinforced biomass based resin composite product. The composite product is fabricated by a method discussed as following: in a compressive molding process, 18 layers of the composite are stacked in a mold and pressurized to 2 MPa. It is heated up gradually to 120° C. and cured for 3 hours. Then it is cooled down to 40° C. with the pressure released. The fibers have a weight content of about 60% in the composite. The tensile strength (Testing standard of ASTM D3039), compressive strength (Testing standard of ASTM D6641) and bending strength (Testing standard of ASTM D790) are tested with a result listed in following Table 6.

TABLE 6

| Tensile strength | | Compressive strength | | Bending strength | |
|---|---|---|---|---|---|
| Strength/ MPa | Modulus/ GPa | Strength/ MPa | Modulus/ GPa | Strength/ MPa | Modulus/ GPa |
| 79.5 | 12.4 | 148.0 | 11.2 | 120.4 | 10.5 |

Embodiment 20: Continuous Plant Fiber Reinforced Composite Foam Laminate

The continuous plant fiber reinforced rosin based epoxy resin composite comprises a rosin based epoxy resin and plant fiber textile distributed within the rosin based epoxy resin. The plant fiber textile comprises sisal, ramie, flax, jute and hemp fiber textile.

The foam laminate according to Embodiment 20 is fabricated with a method discussed as following.

(1) Commercially available natural plant fibers such as sisal, ramie, flax, jute and hemp fiber, and other continuous fiber felt or continuous fiber textile are selected. The plant fiber textile has a thickness of about between 0.3 mm-4 mm. Long plant fibers, such as plant fibers with a length of more than 50 mm, can be selected to be fully thrashed to prepare a long fiber felt with a certain thickness by a needling or felting technology. The long fiber felt can have a thickness of about 0.3 mm-4 mm.

(2) According to the previous embodiments, such as Embodiments 1-7, all plant fibers are subjected to a surface fire retardation treatment or/and a coupling treatment, the coupling agent has a general formula of R2-Si(OR1)3, for example, an amino group is a terminal group of a coupling agent H2N—(CH2)3-Si(OC2H5)3 and an epoxy group is a terminal group of a coupling agent

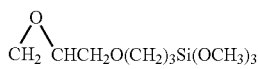

(3) A foaming micro-capsule is prepared as a foaming agent, in which the micro-capsule has a shell made of commercially available and degradable thermoplastic PLA (Polylactic Acid). The micro-capsule is filled with alkane. It is heated up to 100° C.-180° C. and thus the volume of the micro-capsule expand quickly by 50-100 times. Other commercially available foaming micro-capsule can be used as the foaming agent. The capsule shell material comprises silicon rubber, polyacrylonitrile or polyethyl methacrylate. The foaming micro-capsule has a particle size of about 5 µm-50 µm.

(4) A Maleated rosin (MPA) epoxy resin curing agent is prepared.

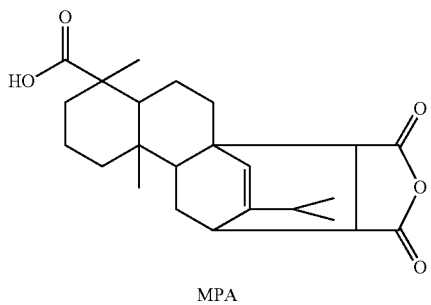 [SMILES: CC(C)C1=CC23CCC4C(C)(C(=O)O)CCCC4(C)C2CC1C1C(=O)OC(=O)C13]

MPA

A common epoxy resin curing agent, such as 3233 and 3234 epoxy resin curing agent from Beijing Institute of Aeronautical Materials, is replaced by the Maleated rosin epoxy resin curing agent so as to form a partial biomass epoxy resin material. The material is made into powders with a particle size of 10 µm to 100 µm.

(5) According to the density of the required fiber reinforced foam laminate, the micro-capsule foaming agent is mixed into the resin and adjusted to have a proportion of 5%-15% in the epoxy resin. Both components are stirred in a high-speed mixer and mixed uniformly so that an aqueous suspension is prepared.

(6) The plant fiber felt or textile according to step (2) is fully impregnated (Commonly known as slurry impregnation) in the aqueous suspension and dried properly so that a foaming pre-impreg is obtained.

(7) The above foaming pre-impreg is heated up to 100° C.-180° C. and laid aside for 10 min-15 min. The micro-capsule expands, and in turn the foaming pre-impreg expands by 5-8 times in a thickness thereof. During the heating process, the thermosetting epoxy resin is cured so that the continuous plant fiber reinforced biomass based resin composite laminate is obtained.

Embodiment 21

(1) A short-cut ramie fiber is used to prepare a ramie non-woven felt with an area density of 400 g/m² using a needling machine.

(2) The ramie non-woven felt is soaked in an aqueous solution of a KH550 coupling agent with a concentration of 3% and dried. Then it is soaked in an aqueous solution of a nitrogen phosphor fire retardant with a concentration of 10% and dried in the air.

(3) A micro-capsule foaming agent with a particle size of 10 µm, a capsule shell made of degradable thermoplastic polylactic acid (PLA) and a foaming temperature of 120° C. is prepared.

(4) An MPA rosin based epoxy resin curing agent is prepared.

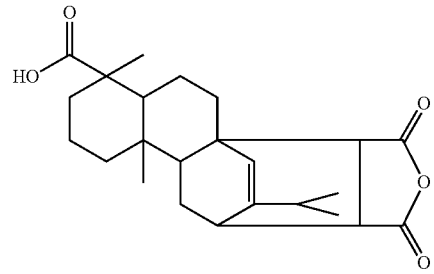

MPA

A 3233 epoxy resin curing agent from Beijing Institute of Aeronautical Materials is replaced by the MPA rosin based epoxy resin curing agent to form a partial biomass epoxy resin. And then the partial biomass epoxy resin is made into powder with a particle size of 10 µm-20 µm.

(5) The micro-capsule foaming agent according to step (3) is added to the epoxy resin powder according to step (4) with a proportion of 15%. Both components are fully stirred and mixed uniformly in a high-speed mixer so that a binary powder is obtained.

(6) An aqueous suspension of the binary powder is obtained according to step (5) is prepared. The fiber plant felt or textile is fully soaked into the suspension. The residual suspension is squeezed.

(7) The squeezed ramie non-woven cloth is set vertically in an oven with a temperature of 120° C. and cured for 15 min before taking out.

Embodiment 22

(1) A continuous sisal fiber is used to prepare a sisal non-woven felt with an area density of 100 g/m² using a felting machine.

(2) The ramie non-woven felt is soaked in an aqueous solution of a KH550 coupling agent with a concentration of 2% and dried. Then it is soaked in an aqueous solution of a nitrogen phosphor fire retardant with a concentration of 10% and dried in the air.

(3) A micro-capsule foaming agent with a particle size of 10 µm, a capsule shell made of degradable thermoplastic PLA and a foaming temperature of 120° C. is prepared.

(4) An MPA rosin based epoxy resin curing agent is prepared.

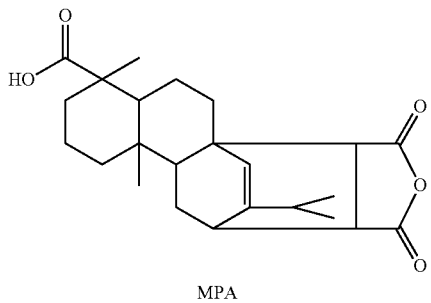 [SMILES: CC(C)C1=CC23CCC4C(C)(C(=O)O)CCCC4(C)C2CC1C1C(=O)OC(=O)C13]

MPA

A 3234 epoxy resin curing agent from Beijing Institute of Aeronautical Materials is replaced by the MPA rosin based epoxy resin curing agent to form a partially degradable 3234 epoxy resin. And then the partially degradable 3234 epoxy resin is made into powder with a particle size of 10 μm-20 μm.

(5) The micro-capsule foaming agent according to step (3) is added to the epoxy resin powder according to step (4) with a proportion of 12%. Both components are fully stirred and mixed uniformly in a high-speed mixer so that a binary powder is obtained.

(6) An aqueous suspension of the binary powder is obtained according to step (5) is prepared. The fiber plant felt or textile is fully impregnated into the suspension. The residual suspension is squeezed.

(7) The squeezed ramie non-woven cloth is set vertically in an oven with a temperature of 120° C. and cured for 10 min before taking out.

Embodiment 23

(1) A continuous flax fiber is used to prepare a flax non-woven felt with an area density of 80 g/m² using a felting machine.

(2) The flax non-woven felt is soaked in an aqueous solution of a KH550 coupling agent with a concentration of 2% and dried. Then it is soaked in an aqueous solution of a nitrogen phosphor fire retardant with a concentration of 15% and dried in the air.

(3) A micro-capsule foaming agent with a particle size of 10 μm-20 μm, a capsule shell made of polyacrylonitrile and a filler of alkane is prepared.

(4) An MPA rosin based epoxy resin curing agent is prepared.

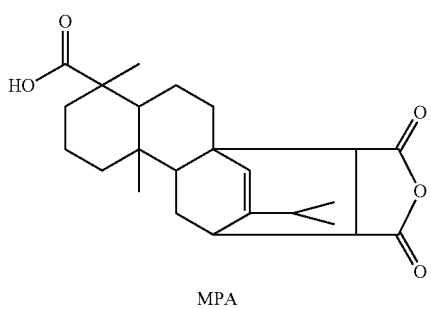 [SMILES: CC(C)C1=CC23CCC4C(C)(C(=O)O)CCCC4(C)C2CC1C1C(=O)OC(=O)C13]

MPA

A 3234 epoxy resin curing agent from Beijing Institute of Aeronautical Materials is replaced by the MPA rosin based epoxy resin curing agent to form a partially degradable 3234 epoxy resin. And then the partially degradable 3234 epoxy resin is made into powder with a particle size of 10 μm-20 μm.

(5) The micro-capsule foaming agent according to step (3) is added to the epoxy resin powder according to step (4) with a proportion of 12%. Both components are fully stirred and mixed uniformly in a high-speed mixer so that a binary powder is obtained.

(6) An aqueous suspension of the binary powder is obtained according to step (5) is prepared. The fiber plant felt or textile is fully impregnated into the suspension. The residual suspension is squeezed.

(7) The squeezed ramie non-woven cloth is set vertically in an oven with a temperature of 150° C. and cured for 10 min before taking out.

Embodiment 24

(1) A continuous jute fiber is used to prepare a jute non-woven felt with an area density of 260 g/m² using a needling machine.

(2) The ramie non-woven felt is soaked in an aqueous solution of a KH550 coupling agent with a concentration of 3% and dried. Then it is soaked in an aqueous solution of a nitrogen phosphor fire retardant with a concentration of 12% and dried in the air.

(3) A micro-capsule foaming agent with a particle size of 10 μm-20 μm, a capsule shell of degradable thermoplastic PLA, a filler of alkane and a foaming temperature of 180° C. is prepared.

(4) An MPA rosin based epoxy resin curing agent is prepared.

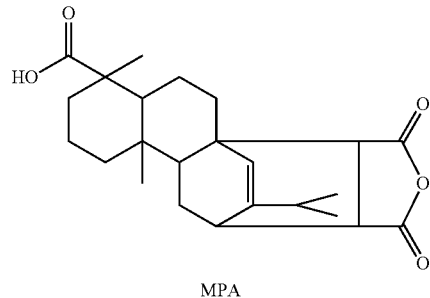 [SMILES: CC(C)C1=CC23CCC4C(C)(C(=O)O)CCCC4(C)C2CC1C1C(=O)OC(=O)C13]

MPA

A 3234 epoxy resin curing agent from Beijing Institute of Aeronautical Materials is replaced by the MPA rosin based epoxy resin curing agent to form a partial biomass epoxy resin. The partial biomass epoxy resin is then made into powder with a particle size of 10 μm-20 μm.

(5) The micro-capsule foaming agent according to step (3) is added to the epoxy resin powder according to step (4) with a proportion of 15%. Both components are fully stirred and mixed uniformly in a high-speed mixer so that a binary powder is obtained.

(6) An aqueous suspension of the binary powder is obtained according to step (5) is prepared. The fiber plant felt or textile is fully impregnated into the suspension. The residual suspension is squeezed.

(7) The squeezed jute non-woven cloth is set vertically in an oven with a temperature of 180° C. and cured for 13 min before taking out.

Embodiment 25

(1) A short-cut ramie fiber is used to prepare a ramie non-woven felt with an area density of 120 g/m² using a felting machine.

(2) The ramie non-woven felt is soaked in an aqueous solution of a KH560 coupling agent with a concentration of 2% and dried. Then it is soaked in an aqueous solution of a nitrogen phosphor fire retardant with a concentration of 10% and dried in the air.

(3) A micro-capsule foaming agent with a particle size of 10 μm, a capsule shell of degradable thermoplastic PLA and a foaming temperature of 150° C. is prepared.

(4) An MPA rosin based epoxy resin curing agent is prepared.

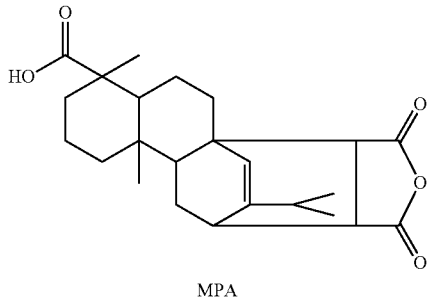 [SMILES: CC(C)C1=CC23CCC4C(C)(C(=O)O)CCCC4(C)C2CC1C1C(=O)OC(=O)C13]

MPA

A 3219 epoxy resin curing agent from Beijing Institute of Aeronautical Materials is replaced by the MPA rosin based epoxy resin curing agent. A partial biomass epoxy resin is formed and then made into powder with a particle size of 10 μm-20 μm.

(5) The micro-capsule foaming agent according to step (3) is added to the epoxy resin powder according to step (4), which has a proportion of 10%. Both components are fully stirred and mixed uniformly in a high-speed mixer so that a binary powder is obtained.

(6) An aqueous suspension of the binary powder is obtained according to step (5) is prepared. The fiber plant felt or textile is fully impregnated into the suspension. The residual suspension is squeezed.

(7) The squeezed jute non-woven cloth is set vertically in an oven with a temperature of 150° C. and cured for 12 min before taking out.

According to Decision J15/88 of European Patent Office, Board of Appeals, other embodiments of the present invention are constituted by following continuous numbered 41 terms. In particular, they could be combined with the embodiments of the present invention.

1. A plant fiber textile comprising a matrix resin and continuous plant fibers distributed within the matrix resin, wherein the plant fibers are subjected to a surface modification pretreatment comprising a coupling treatment with a coupling agent and/or a fire retardation treatment with a flame retardant.

2. The plant fiber textile of term 1, wherein the based resin comprises phenol resin, epoxy resin or polyester.

3. The plant fiber textile of term 1 or 2, wherein the plant fiber is a fiber of plant selected from ramie, jute, kenaf, hemp, sisal or flax.

4. The plant fiber textile of any one of terms 1 to 3, wherein the coupling agent is a silane coupling agent or a potassium permanganate solution, the silane coupling agent being at least one selected from the group consisting of vinyltriethoxysilane, γ-(methacryloxy)propyltrimethoxysilane, γ-amino propyltriethoxysilane and γ-(2,3-epoxy-propoxy)propyltrimethoxysilane.

5. The plant fiber textile of any one of terms 1 to 4, wherein the fire retardant is a nitrogen phosphor based fire retardant such as ZR-PZM type expandable fire retardant, TZ-01 nitrogen phosphor general fire retardant, TPU-1 or Newray 911.

6. The plant fiber textile of any one of terms 1 to 5, wherein the plant fiber textile has plant fibers with unidirection.

7. The plant fiber textile of any one of terms 1 to 6, wherein the plant fiber textile has random oriented plant fibers.

8. The plant fiber textile of any one of terms 1 to 7, wherein the plant fiber textile and the resin matrix after the coupling treatment have a binding force greater than that of the plant fiber textile without the coupling treatment and the resin matrix.

9. The plant fiber textile of any one of terms 1 to 8, wherein the resin matrix is fire retardant.

10. A laminate having a laminated structure, comprising:
a plant fiber textile comprising a matrix resin and continuous plant fibers distributed within the matrix resin, wherein the plant fibers are subjected to a surface modification pretreatment comprising a coupling treatment with a coupling agent and/or a fire retardation treatment with a fire retardant,
at least one layer selected from a group consisting of following layers:
glass fiber, aramid fiber or carbon fiber non-woven cloth or textile, preferably distributed within the matrix resin;
polymer fiber non-woven cloth or textile, preferably distributed within the matrix resin; or
polymer foam or rubber material.

11. The laminate of term 10, wherein the resin matrix comprises phenol resin, epoxy resin or polyester.

12. The laminate of term 10 or 11, wherein the plant fiber is a fiber of a plant selected from ramie, jute, kenaf, hemp, sisal or flax.

13. The laminate of any one of terms 10 to 12, wherein the coupling agent is a silane coupling agent or a potassium permanganate solution, the silane coupling agent being at least one selected from the group consisting of vinyltriethoxysilane, γ-(methacryloxy)propyltrimethoxysilane, γ-amino propyltriethoxysilane, and γ-(2,3-epoxy-propoxy)propyltrimethoxysilane.

14. The laminate of any one of terms 10 to 13, wherein the fire retardant is a nitrogen phosphor based fire retardant such as ZR-PZM type expandable fire retardant (From Shandong Province Qingzhou City Chemical Factory), TZ-01 nitrogen phosphor general fire retardant (From Lianyungang Fanghe Chemical Co., Ltd.), TPU-1 or Newray 911 (From Changzhou City Niulei Fire Retardant Factory).

15. The laminate of any one of terms 10 to 14, wherein the polymer fiber non-woven cloth or textile comprises polyimide fiber, polybenzimidazole, polybenzoxazole, polylactic acid, polyethylene, polypropylene or nylon fiber non-woven cloth or fiber textile.

16. The laminate of terms any one of terms 10 to 15, wherein the polymer foam or rubber material comprises polyimide, polymethacrylimide, polyvinyl chloride, polyethylene, polypropylene, epoxy, polyurethane, phenol-formaldehyde foam, butylbenzene, bucrilate, maleic, polysulfide or silicon rubber.

17. The laminate of any one of terms 10 to 16, wherein the laminated structure has a periodic or non-periodic structure.

18. The laminate of any one of terms 10 to 17, wherein laminated structure has a central symmetrical structure.

19. The laminate of any one of terms 10 to 18, wherein the resin matrix is fire retardant.

20. The laminate of any one of terms 10 to 19, wherein the plant fiber textile layer is an outermost layer of the laminate.

21. The laminate of any one of terms 10 to 20, wherein the polymer foam or rubber material is an inner layer of the laminate.

22. A method of fabricating a plant fiber textile laminate, comprising following steps:

preparing a continuous plant fiber textile and performing a surface modification pretreatment on the continuous plant fiber textile using a coupling agent and/or a fire retardant;

pre-impregnating the plant fiber textile and/or glass fiber, aramid fiber or carbon fiber non-woven cloth or textile and/or polymer fiber non-woven cloth or textile into a resin matrix to prepare a pre-impreg of the plant fiber textile and/or glass fiber, aramid fiber or carbon fiber non-woven cloth or textile and/or polymer fiber non-woven cloth or textile;

stacking the pre-impreg of the plant fiber textile with at least one layer to form a laminated structure, wherein the at least one layer is selected from a group consisting of following layers: glass fiber, aramid fiber or carbon fiber non-woven cloth or textile, polymer fiber non-woven cloth or textile pre-impreg or polymer foam or rubber material; and curing and molding the laminated structure to prepare the laminate, the molding process being for example, an autoclave or compressive molding process.

23. The method of term 22, wherein the coupling agent is a silane coupling agent or a potassium permanganate solution, the silane coupling agent being preferably selected from the group consisting of vinyltriethoxysilane, γ-(methacryloxy)propyltrimethoxysilane, γ-amino propyltriethoxysilane, and γ-(2,3-epoxy-propoxy)propyltrimethoxysilane.

24. The method of term 22 or 23, wherein the fire retardant is a nitrogen phosphor based fire retardant such as ZR-PZM type expandable fire retardant (From Shandong Province Qingzhou City Chemical Factory), TZ-01 nitrogen phosphor general fire retardant (From Lianyungang Fanghe Chemical Co., Ltd.), TPU-1 or Newray 911 (From Changzhou City Niulei Fire Retardant Factory).

25. The method of any one of terms 22 to 24, wherein after the surface modification pretreatment using the coupling agent, the plant fiber textile is dried, soaked into water to remove residual potassium permanganate solution, and then dried again.

26. The method of any one of terms 22 to 25, wherein the resin matrix comprises phenol resin, epoxy resin or polyester.

27. The method of any one of terms 22 to 26, wherein the plant fiber is a fiber of a plant selected from ramie, jute, ambary, hemp, sisal or flax.

28. The method of any one of terms 22 to 27, wherein the polymer fiber non-woven cloth or textile comprises polyimide fiber, polybenzimidazole, polybenzoxazole, polylactic acid, polyethylene, polypropylene or nylon fiber non-woven cloth or fiber textile.

29. The method of any one of terms 22 to 28, wherein the polymer foam comprises polyimide, polymethacrylimide, polyvinyl chloride, polyethylene, polypropylene, epoxy, polyurethane, phenol-formaldehyde foam, the rubber material comprising butylbenzene, bucrilate, maleic, polysulfide or silicon rubber.

30. A method of fabricating a plant fiber textile laminate, the plant fiber textile laminate comprising a plant fiber textile layer comprising an unsaturated polyester matrix and continuous plant fibers distributed within the unsaturated polyester matrix, wherein the plant fibers are subjected to a surface modification pretreatment comprising a coupling treatment with a coupling agent and/or a fire retardation treatment with a fire retardant, at least one layer is selected from the group consisting of following layers: glass fiber, aramid fiber or carbon fiber non-woven cloth or textile, preferably distributed within the unsaturated polyester matrix; polymer fiber non-woven cloth or textile, preferably distributed within the unsaturated polyester matrix; or polymer foam or rubber material, the method comprising:

preparing a continuous plant fiber textile and performing a surface premodification treatment on the continuous plant fiber textile using a coupling agent and/or a fire retardant;

preparing the laminate with the plant fiber textile and/or glass fiber, aramid fiber or carbon fiber non-woven cloth or textile and/or polymer fiber non-woven cloth or textile and the unsaturated polyester matrix in a direct liquid curing and molding process.

31. A plant fiber reinforced biomass resin sheet material consisting of a reinforcement material and a structure adhesive, wherein the reinforcement material has a content of 10~70 wt % and the structure adhesive has a content of 30~90 wt % in the biomass resin sheet material, the reinforcement material being a continuous plant fiber textile, laid fabric, mesh cloth or non-continuous plant fiber non-woven cloth, and the structure adhesive being a biomass rosin based epoxy resin pre-polymer.

32. The plant fiber reinforced biomass resin laminate of term 31, wherein the reinforcement material has an area density of 20 $g/m^2$~300 $g/m^2$.

33. The plant fiber reinforced biomass resin laminate of term 31, wherein the structure adhesive is a biomass rosin based epoxy pre-impreg with a composition and mass ratio of: rosin based epoxy resin 100 parts; epoxy resin curing agent 10~100 parts; curing accelerant 0.5~3 parts; thermoplastic polymer 10~50 parts.

34. The plant fiber reinforced biomass resin laminate of term 33, wherein the epoxy curing agent is methyl nadie anhydride, methylhexahydrophthalic anhydride, methyltetrahydrophthalic anhydride, dicyandiamide or oxaborinaneboron amine complexes (Brand name of #594).

35. The plant fiber reinforced biomass resin laminate of term 33, wherein the curing accelerant is DMP-30, boron trifluoride-ethyl amine complex or 1,1'-dimethyl-3-phenylurea.

36. The plant fiber reinforced biomass resin laminate of term 33, wherein the thermoplastic polymer is phenolphthalein modified polyether ketone, phenolphthalein modified polyether sulfone or phenolphthalein modified polyimide with a particle size of 50 meshes-100 meshes.

37. A method of fabricating the plant fiber reinforced biomass resin laminate of term 31, wherein the method comprises following steps:

(1) preparing a reinforcement material a continuous fiber plant textile, laid fabric, mesh cloth or non-continuous plant fiber non-woven cloth with an area density of 20 $g/m^2$~300 $g/m^2$ is prepared from ramie, flax, jute, hemp, sisal or kenaf by an existing weaving technology, and is ready for use after wrapping and rolling;

(2) preparing the structure adhesive a rosin based epoxy resin, epoxy resin curing agent, curing accelerant and thermoplastic polymer are mixed uniformly in proportion by a high-speed shear force at a certain temperature and then is cooled down to obtain a biomass rosin based epoxy resin pre-polymer; and (3) the prepared biomass rosin based pre-polymer uniformly is applied on a surface of a release paper and transferred the biomass rosin based epoxy resin pre-polymer onto the reinforcement material by a heating pressure roller, the biomass rosin based pre-polymer having a content of 30~90 wt % in a total weigh of the reinforcement material and the biomass rosin based pre-polymer, so as to obtain a plant fiber reinforced biomass resin laminate with both sides protected by the release paper, the plant fiber reinforced biomass resin laminate is then rolled to be kept at room temperature or refrigerated.

38. A plant fiber reinforced biomass resin based foam laminate, comprising a reinforcement body of ramie, flax, hemp or jute plant fiber, carried with an expandable biomass resin and a biomass epoxy resin, wherein the reinforcement body has a weight content of 40%~60%.

39. A method of fabricating the plant fiber reinforced biomass resin based foam laminate, comprising:

(1) preparing a fiber felt with a thickness of 0.1-5 mm from a natural fiber of a plant selected from ramie, flax, hemp or jute by an available plant fiber felting technology in industry, and performing a fire retardation and a compatibility promotion treatment to the plant fiber felt;

(2) preparing a micro-capsule foaming agent using polylactic acid as a capsule shell filled with alkane therein, the micro-capsule foaming agent having a particle size of 5 µm-50 µm, the alkane has an amount enabling the micro-capsule to expand by 50-100 times in term of volume after being heated up to 100° C.-180° C.;

(3) preparing a Maleated rosin based epoxy resin curing agent, mixing and grinding the Maleated rosin based epoxy resin curing agent with the epoxy resin to prepare a fine powder of a partial biomass epoxy resin, the fine powder having a particle size of 10 µm to 100 µm;

(4) adding the micro-capsule foaming agent in a content of 5%-15% to the fine powder of the epoxy resin to prepare an aqueous suspension;

(5) fully impregnating the plant fiber felt after the fire retardation and compatibility promotion treatment into the suspension and drying to obtain a foaming pre-impreg to be ready for use; and (6) heating the dried plant fiber felt according to (5) up to 100° C.-180° C. and soaking for 10 min-15 min, so as to expand the plant fiber felt by 5-8 times in a thickness thereof to obtain a continuous plant fiber reinforced biomass resin composite foam laminate.

40. The method of fabricating the plant fiber reinforced biomass resin composite foam laminate of term 39, wherein the fiber felt has a single filament felt with a thickness of 0.3 mm-4 mm.

41. The method of fabricating the plant fiber reinforced biomass resin composite foam laminate of term 40, wherein the technology of preparing the fiber felt is a needling or felting technology.

The detailed description of the preferable embodiments is for describing the features and the spirit of the present invention more clearly, and not for limiting the scope of the present invention by the disclosed preferable embodiments. Instead, it is expected that all of the modifications and equivalent arrangements should fall into the scope of the claimed invention.

What is claimed is:

1. A plant fiber reinforced biomass resin based foam laminate comprising:
   a biomass epoxy resin; and
   a reinforcement body supporting the biomass epoxy resin, and including a plant fiber selected from ramie, flax, hemp, or jute plant fiber, the reinforcement body having a weight content of 40% to 60%, wherein the reinforcement body is impregnated into a first aqueous solution including a coupling agent for a coupling treatment and/or a second aqueous solution including a fire retardant for a fire retardant treatment,
   the coupling agent includes a silane coupling agent or a potassium permanganate solution, the silane coupling agent being at least one selected from the group consisting of vinyltriethoxysilane, γ-amino propyltriethoxysilane, or γ-(2,3-epoxy-propoxy) propyltrimethoxysilane, and
   the fire retardant includes a nitrogen phosphor based fire retardant,
   wherein the biomass epoxy resin includes:
   a biomass epoxy resin,
   a Maleated rosin based epoxy resin curing agent, and
   a micro-capsule foaming agent including a polylactic acid shell and an alkane enclosed in the polylactic acid shell, wherein the micro-capsule foaming agent expands by 50 to 100 times by volume after being heated up to 100° C. to 180° C.

2. The plant fiber reinforced biomass resin based foam laminate according to claim 1, wherein the reinforcement body is a continuous plant fiber textile, laid fabric cloth, mesh cloth, or non-continuous plant fiber non-woven cloth.

3. The plant fiber reinforced biomass resin based foam laminate according to claim 1, further comprising a first layer including
   glass fiber, aramid fiber or carbon fiber non-woven cloth or textile dispersed within a first matrix resin;
   polymer fiber non-woven cloth or textile dispersed within a second matrix resin, the polymer fiber non-woven cloth or textile comprising: polyimide fiber, polybenzimidazole, polybenzoxazole, polylactic acid, polyethylene, polypropylene or nylon fiber non-woven cloth or fiber textile; or
   polymer foam or rubber material, the polymer foam comprising polyimide, polymethacrylimide, polyvinyl chloride, polyethylene, polypropylene, epoxy, polyurethane, phenol-formaldehyde foam, the rubber material comprising butylbenzene, bucrilate, maleic, polysulfide or silicon rubber,
   wherein the biomass epoxy resin and the reinforcement body form a second layer stacked on the first layer.

4. The plant fiber reinforced biomass resin based foam laminate according to claim 1, wherein the biomass epoxy resin is formed by
   preparing an aqueous suspension including the micro-capsule foaming agent and a powder of a partial biomass epoxy resin having a particle size of 10 µm to 100 µm, the fine powder formed from mixing and grinding the Maleated rosin based epoxy resin curing agent with the biomass epoxy resin, and
   impregnating the reinforcement body into the aqueous suspension and heated at 100° C. to 180° C.

5. A method of fabricating a plant fiber reinforced biomass resin based foam laminate comprising a biomass epoxy resin and a plant fiber felt supporting the biomass epoxy resin, the plant fiber felt including ramie, flax, hemp, or jute plant fiber and having a weight content of 40% to 60%, the method comprising:
   preparing the plant fiber felt with a thickness of 0.1 to 5 mm from a natural fiber of a plant selected from ramie, flax, hemp, or jute;
   performing a fire retardation treatment to the plant fiber felt by impregnating the plant fiber felt into a first aqueous solution including a fire retardant, the fire retardant including a nitrogen phosphor based fire retardant;

performing a compatibility promotion treatment to the plant fiber felt by impregnating the plant fiber felt into a second aqueous solution including a coupling agent, the coupling agent including a silane coupling agent or a potassium permanganate solution, the silane coupling agent being at least one selected from the group consisting of vinyltriethoxysilane, γ-amino propyltriethoxysilane, or γ-(2,3-epoxy-propoxy) propyltrimethoxysilane;

preparing a micro-capsule foaming agent including a capsule shell formed from polylactic acid and alkane enclosed in the capsule shell, the micro-capsule foaming agent having a particle size of 5 μm to 50 μm, the alkane having an amount enabling the micro-capsule to expand by 50 to 100 times in term of volume after being heated up to 100° C. to 180° C.;

mixing and grinding a Maleated rosin based epoxy resin curing agent with an epoxy resin to form a fine powder of a partial biomass epoxy resin having a particle size of 10 μm to 100 μm;

adding the micro-capsule foaming agent in a content of 5% to 15% to the fine powder of the partial biomass epoxy resin to prepare an aqueous suspension;

after the fire retardation treatment and the compatibility promotion treatment are performed on the plant fiber felt, fully impregnating the plant fiber felt into the aqueous suspension and drying the aqueous suspension to obtain a foam pre-impreg; and heating the foam pre-impreg at 100° C. to 180° C. for 10 to 15 minutes, so as to expand the plant fiber felt by 5 to 8 times in a thickness thereof to obtain the continuous plant fiber reinforced biomass resin based foam laminate.

6. The method of claim 5, wherein the plant fiber felt is a single filament felt having a thickness of 0.3 mm to 4 mm.

7. The method of claim 6, wherein in preparing the plant fiber felt, a needling or felting technique is performed on the plant fiber felt.

8. A plant fiber reinforced biomass resin based foam laminate comprising:
a biomass epoxy resin; and
a reinforcement body supporting the biomass epoxy resin, and including a plant fiber selected from ramie, flax, hemp, or jute plant fiber, the reinforcement body having a weight content of 40% to 60%, wherein the reinforcement body is impregnated into a first aqueous solution including a coupling agent for a coupling treatment and a second aqueous solution including a fire retardant for a fire retardant treatment,
the coupling agent includes a silane coupling agent or a potassium permanganate solution, the silane coupling agent being at least one selected from the group consisting of vinyltriethoxysilane, γ-amino propyltriethoxysilane, or γ-(2,3-epoxy-propoxy) propyltrimethoxysilane, and
the fire retardant includes a nitrogen phosphor based fire retardant, wherein the biomass epoxy resin includes:
a biomass epoxy resin,
a Maleated rosin based epoxy resin curing agent, and
a micro-capsule foaming agent including a polylactic acid shell and an alkane enclosed in the polylactic acid shell, wherein the micro-capsule foaming agent expands by 50 to 100 times by volume after being heated up to 100° C. to 180° C.

9. The plant fiber reinforced biomass resin based foam laminate according to claim 1, wherein the coupling agent includes a potassium permanganate solution.

10. The plant fiber reinforced biomass resin based foam laminate according to claim 8, wherein the coupling agent includes a potassium permanganate solution.

* * * * *